United States Patent [19]

Haydon et al.

[11] 3,770,998
[45] Nov. 6, 1973

[54] ELECTRIC ROTATING MACHINE

[75] Inventors: Arthur W. Haydon, Middlebury;
John J. Dean, Oxford, both of Conn.

[73] Assignee: Tri-Tech, Inc., Waterbury, Conn.

[22] Filed: Aug. 25, 1972

[21] Appl. No.: 283,804

[52] U.S. Cl. ............... 310/156, 310/164, 310/254, 310/257
[51] Int. Cl. .......................................... H02k 21/16
[58] Field of Search .................... 310/152, 156, 162, 310/164, 180, 254, 257; 318/165, 166

[56] References Cited
UNITED STATES PATENTS

| | | | |
|---|---|---|---|
| 3,014,141 | 12/1961 | Riggs | 310/164 X |
| 3,495,107 | 2/1970 | Haydon | 310/164 X |
| 3,495,111 | 2/1970 | Haydon | 310/164 X |

Primary Examiner—J. D. Miller
Assistant Examiner—H. Huberfeld
Attorney—Lee C. Robinson, Jr.

[57] ABSTRACT

A small, round synchronous motor including a permanent magnet rotor and only a single salient stator pole in magnetic flux relationship with the rotor. Upon the energization of the field coil for the motor, at any given moment the stator pole is of one polarity. When the field coil is de-energized, the rotor consistently assumes a position with respect to the stator pole in which the rotor poles are displaced from the center of the stator pole so that, when the coil is again energized, the rotor is self-starting.

16 Claims, 11 Drawing Figures

PATENTED NOV 6 1973 3,770,998

PATENTED NOV 6 1973 3,770,998

ELECTRIC ROTATING MACHINE

BACKGROUND OF THE INVENTION

The present invention relates to electric rotating machines and is particularly applicable to self-starting synchronous motors.

There has been developed an electric motor which exhibits substantial output torque at the rotor shaft and is highly efficient. Representative motors of this type are disclosed, for example, in A. W. Haydon U.S. Pat. No. 3,495,113 granted Feb. 10, 1970. Such motors utilize two or more pole pieces which each have a single stator pole, with the result that the motor has a minimum of two such poles. The rotor is reliably and consistently self-starting, and particularly in cases in which certain of the stator poles are shaded the rotor uniformly starts in a predetermined direction.

One problem which has existed in the design of alternating current motors and other electric rotating machines, including those of the foregoing type, is that for many appications the unidirectional feature of the rotor is not necessary and only adds to the machine's manufacturing cost and complexity. However, previous attempts to simplify the prior machines by eliminating this feature in many instances resulted in a motor which was not reliably self-starting. To retain the self-starting characteristic and for other reasons, it was heretofore generally believed to be necessary to utilize a plurality of salient stator poles, often of different instantaneous polarity, in magnetic flux relationship with the rotor.

SUMMARY OF THE INVENTION

One general object of this invention, therefore, is to provide a new and improved electric motor or other electric rotating machine.

More specifically, it is an object of this invention to provide a machine of the character indicated which is self-starting and which has good starting and running torque.

Another object of this invention is to provide such a machine of a design which eliminates certain parts heretofore generally believed to be necessary.

A further object of this invention is to provide an electric rotating machine utilizing comparatively simple mechanical and electrical components which is economical to manufacture and thoroughly reliable in operation.

In contrast to the prior machines, the foregoing objects are achieved through the use of a machine which includes only a single salient stator pole in magnetic flux relationship with the rotor. The stator pole is energized with an alternating magnetic field, and, at a given moment, is of one polarity. When the machine is de-energized, the rotor consistently assumes a position with respect to the stator pole in which the rotor poles are displaced from the center of the stator pole so that, when the machine is again energized, the rotor is self-starting. In the quiescent position of the rotor, the path of minimum reluctance of the magnetic flux is one in which the flux passes from a given rotor pole, circumferentially through the stator pole, and back to another rotor pole.

The machines of the present invention enable a substantial improvement in economy of design while attaining excellent reliability of starting and operating characteristics. The machines represent such a departure from the principle which had been accepted in the prior art that they constitute a major breakthrough in the art.

The foregoing and other objects, features and advantages of the invention will be more readily understood from the following description of certain preferred embodiments, when read with reference to the accompanying drawings.

DESCRIPTION OF CERTAIN PREFERRED EMBODIMENTS the

Figure 1:
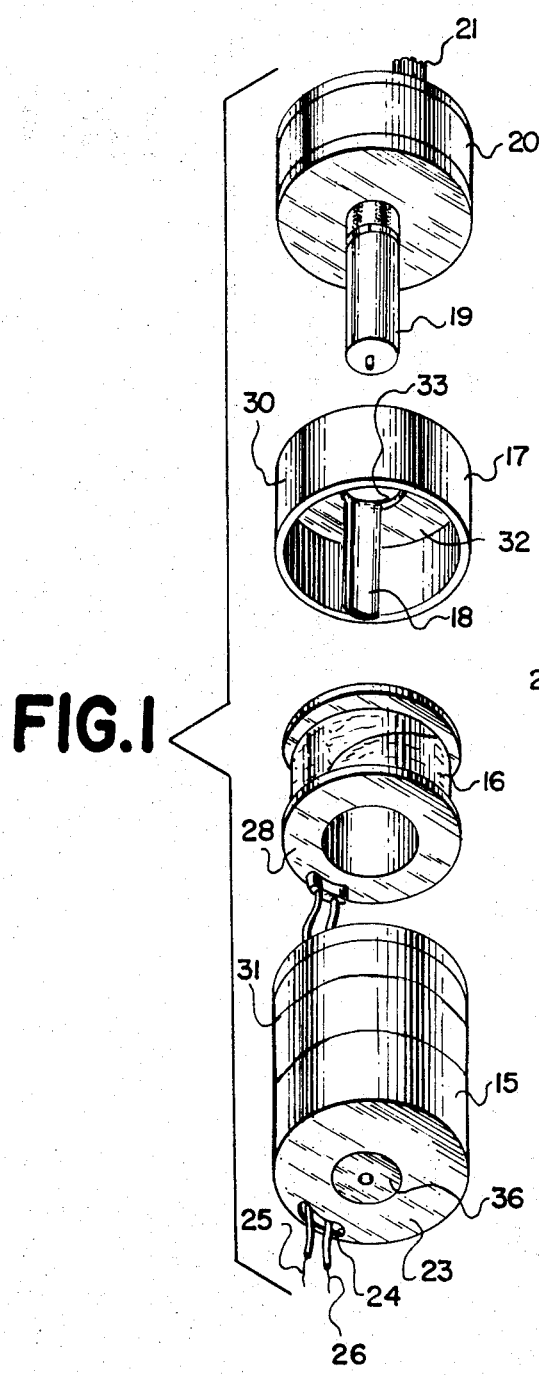
FIG. 1 is an exploded perspective view of an a.c. synchronous motor in accordance with one illustrative embodiment of the invention.
Figure 2:
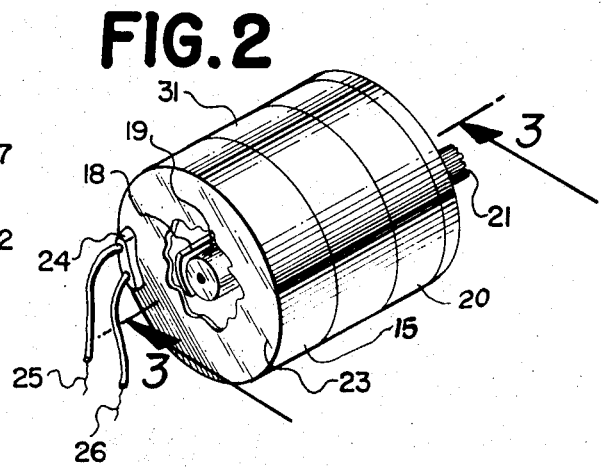
FIG. 2 is a perspective view of the motor illustrated in FIG. 1 with a portion of the motor housing shown broken away.

Referring to the exploded view of FIG. 1, there is shown a single phase alternating current synchronous motor which includes a motor housing 15, a field coil 16, a stator pole piece 17 having only a single salient stator pole 18, a permanent magnet rotor 19, and a gear box 20 which is provided with an output pinion 21. The housing 15 is of generally cup-shaped configuration, and its closed end 23 has a small opening 24 for the leads 25 and 26 from the field coil 16. The field coil is wound in conventional fashion on a supporting bobbin 28.

Figure 3:
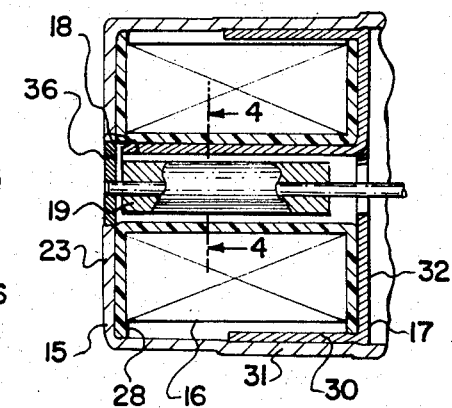
FIG. 3 is a fragmentary sectional view taken along line 3—3 in FIG. 2.

Both the housing 15 and the pole piece 17 are of magnetic material, such as cold rolled steel, which has high permeability, so as to form low reluctance magnetic flux paths. The pole piece 17 is in the form of a comparatively shallow cup and, as best shown in FIG. 3, is arranged to fit within the open end of the housing 15. The cylindrical rim portion 30 of thee pole piece is in facing contact with the corresponding portion 31 of the housing.

The single salient stator pole 18 is bent at right angles from the closed end 32 of the pole piece 17, such that the pole piece extends in an axial direction in magnetic flux relationship with the rotor 19. An opening 33 is provided in the end 32 to accommodate the rotor 19, and the pole 18 protrudes from the periphery of this opening. The pole 18 is integral with the remainder of the pole piece 17 to form a continuous magnetic flux path between the pole piece and the rim portion 30.

The inner end of the pole 18 is spaced in close juxtaposition with the closed end 23 of the housing 15 to define a small air gap therebetween.

Figure 4:
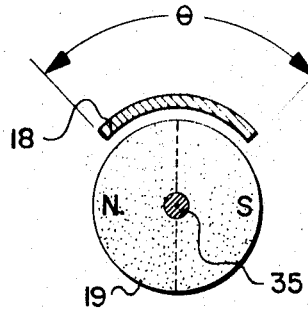
FIG. 4 is a schematic sectional view of the relative positions of the rotor and the stator pole for the motor when the rotor is in its quiescent stopping position.
Figure 5:
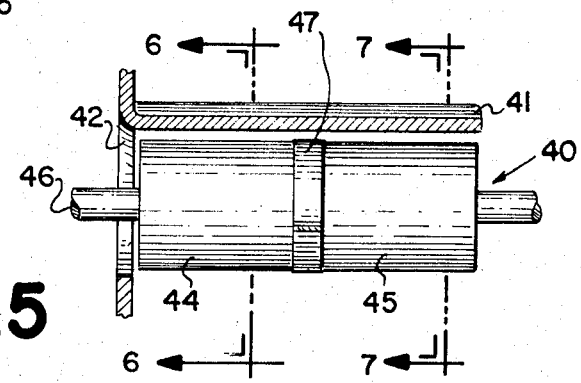
FIG. 5 is a fragmentary side elevational view of an a.c. synchronous motor in accordance with another illustrative embodiment of the invention.

The rotor 19 comprises a comparatively long, thin cylinder of ceramic magnetic material which is magnetized permanently with but a single pair of opposite north and south poles, as indicated by the letters N and S in FIG. 4. The rotor material is relatively "hard" to provide high coercivity, low permeability, a high magnetic energy product and a low specific gravity. Representative examples of such materials are Ceramagnet A, A19 and A70 manufactured by Stackpole Carbon Company, Electronic Components Division, St. Marys, Pa., and Indox I and Indox V manufactured by Indiana General Corporation, Valparaiso, Ind. These are of barium ferrite having a composition of $BaFe_{12}O_{19}$. Another suitable material is Plastiform available from the Leyman Division of Minnesota Mining and Manufacturing Company, Cincinnati, Ohio. The rotor also may be fabricated from a 77 percent platinum 23 percent cobalt material made by the Hamilton Watch Company of Lancaster, Pa. This latter material has a residual induction of 6,400 gauss, a coercive force of 4,300 oersteds and a maximum energy product of $9.0 \times 10^6$ gauss-oersteds. Another particularly advantageous rotor material having an even higher energy product is samarium cobalt, also commercially available at the present time.

The rotor 19 is provided with an axial hole into which a shaft 35 may be secured as by cementing, moulding or other suitable techniques. The shaft 35 is rotatably supported between the gear box 20 and a bearing 36 which is centrally located within the end 32 of the pole piece 17. Appropriate reduction gearing within the gear box serves to connect the shaft to the output pinion 21. In some cases, particularly where Plastiform is used as the rotor material, a series of comparatively thin washers of the material are placed in stacked relationship with each other on the shaft 35 and are adhesively held together to form the rotor. In other preferred embodiments, the Plastiform material may be extruded in tubular form, cut to length and pressed on the shaft.

The use of a long rotor increases the torque available to operate the motor. A relatively high torque is produced when the ratio of rotor length to diameter exceeds about 1.25 to 1. It appears that a ratio of 3 to 1 is particularly suitable. The net usable torque falls off markedly when this ratio approaches 1 to 1. In addition, by maintaining the ratio at least about 1.25 to 1 the low inertia of the rotor enables substantially instantaneous starting and stopping. This latter feature is particularly advantageous in cases in which the motor is used for intermittent timing operations or for other applications where it is desired to avoid the introduction of a cumulative error in the position of the rotor shaft after repeated starts and stops.

FIG. 4 illustrates the relative positions of the rotor 19 and the stator pole 18 with no voltage applied to the field coil. The magnetic poles N and S of the rotor are each displaced 90 degrees from the center of the stator pole. This represents the quiescent position of minimum reluctance which the rotor will always seek and assume when field power is interrupted. For rotors which employ multiple pairs of poles, the displacement angle of the poles in the quiescent position may be expressed as 90 electrical degrees, 180 electrical degrees being taken as the angular distance from a given rotor pole to an adjacent rotor pole of opposite polarity.

The rotor 19 stops in the quiescent or de-energized position with its two poles uniformly centered on opposite sides of the stator pole. An important advantage of this quiescent position is that when the stator is again energized, the motor is self-starting. Furthermore, the quiescent rotor position is an exceptionally good one from the standpoint of producing high starting torque.

To cause the rotor to assume this quiescent position, the stator and rotor are so constructed that, when no current is flowing through the field coil, the reluctance of the magnetic path from the rotor pole circumferentially across the stator pole to the other rotor pole is less than the reluctance of the magnetic path from one rotor pole to the stator pole, and then through the stator pole piece to the other rotor pole.

In the embodiment of the invention illustrated in FIGS. 1–4, the angle $\theta$ subtended by the stator pole 18 with respect to the rotational axis of the rotor 19 is approximately 96.5 mechanical and electrical degrees. To achieve extremely reliable starting characteristics, the angle subtended by the stator pole preferable should be maintained within the range of from about 90 electrical degrees to about 180 electrical degrees. Although angles outside this range may be used for some applications, in cases in which the reliable self-starting features of the motor are desired the range should be maintained to prevent the rotor from occasionally failing to begin its rotation when the field coil is energized.

When the input leads 25 and 26 (FIG. 1) are supplied with a.c. voltage, the pole piece 17 and the stator pole 18 are energized with alternating magnetic flux. Because of the unique design of the device, the rotor 19 automatically and almost instantaneously begins to rotate from the position illustrated in FIG. 4 and reaches synchronous speed within the first half cycle of the applied wave form. At any given moment during the operation of the motor, the stator pole 18 is of one polarity. The direction of rotation is determined by the polarity of the first half cycle. If the flux from the stator pole is of north (N) polarity, the rotor 19 will rotate in a counterclockwise direction, as viewed in FIG. 4. If, on the other hand, the flux from the stator pole is of south (S) polarity, the direction of rotation will be clockwise.

In cases in which unidirectional rotation is desired, any of several conventional mechanical "no-back" devices may be employed, such as those of the camming type, the friction-operated pall type or the ball type. One illustrative device for this purpose is disclosed in Haydon U.S. Pat. No. 3,495,113 referred to above. Alternatively, various nonmechanical arrangements may be utilized to assure unidirectional rotation.

In addition, in some applications where unidirectional operation may be needed, a mechanical device of known type may be interposed between the motor and the load to provide a unidirectional drive. As an illustration, the bidirectional characteristics of the rotor may be converted to oscillating motion which, with a suitable rachet mechanism, may in turn be converted to unidirectional motion.

As the rotor 19 rotates, the flux changes between successive magnetic paths. When the applied voltage approaches the end of the first half cycle and the stator coil flux approaches zero, the rotor has moved through an angle of about 180° from the position shown in FIG. 4. The rotor flux follows a path which passes from the north pole of the rotor to the stator pole 18, circumferentially through the stator pole, back to the south pole of the rotor, and then through the rotor to the north pole. One quarter of an a.c. cycle thereafter, assuming counterclockwise rotation, the north pole of the rotor is opposite the stator pole, and there is a flux path from the north rotor pole to the stator pole, longitudinally along the stator pole and through the stator structure, back to the south rotor pole and through the rotor to the original pole. Still later, the rotor poles again straddle the stator pole in the manner shown in FIG. 4, and the rotor flux follows a path from the north rotor pole, circumferentially through the stator pole but in the opposite direction from that of the first-mentioned flux, then to the south rotor pole and through the rotor to the north pole. One quarter of a cycle later, the south rotor pole is in line with the stator pole, and the flux path again extends longitudinally along the stator pole, but in the opposite direction.

Hence, during operation of the motor, there are four flux condition, the flux tending to switch conditions, succession through these four conditions. In two of these conditions there is a significant flux component running circumferentially through the stator pole (clockwise or counterclockwise, as viewed in FIG. 4). In the other two conditions, the flux in the stator pole is predominantly in a longitudinal direction.

When the field coil 16 is de-energized, the rotor 19 consistently stops in a position in which the two rotor poles straddle the stator pole. This is the position of minimum reluctance described heretofore, and the path of the rotor flux is one in which the flux passes from the north pole of the rotor, circumferentially through the stator pole, back to the south rotor pole and then through the rotor to the north pole.

FIGS. 5–11 are illustrative of a rotor 40 and a single salient stator pole 41 of an a.c. synchronous motor in accordance with another preferred embodiment of the invention. The stator structure of the motor is similar to that described heretofore with respect to the embodiment of FIGS. 1–4 and includes a stator pole piece 42 which cooperates with a housing and field coil (not shown in FIGS. 5–11 but illustrated in FIG. 1) to produce an alternating magnetic flux. With the field coil in its energized condition, at any given moment the stator pole flux is of polarity.

Figure 6:
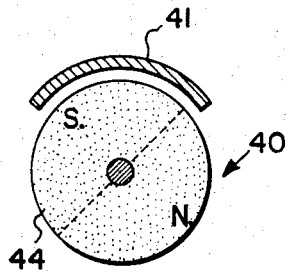
FIGS. 6 and 7 are schematic sectional views respectively taken along the lines 6—6 and 7—7 in FIG. 5 and showing one of the quiescent stopping positions for the motor of that figure.
Figure 7:
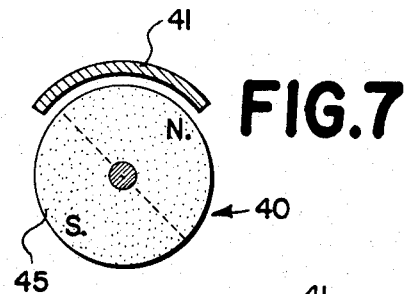

The rotor 40 is in the form of two axially spaced rotor sections 44 and 45. The sections 44 and 45 are rigidly affixed to the rotor shaft 46 and each have only a single pair of rotor poles N and S. The sections 44 and 45 should have a fixed angular displacement with respect to one another which is less than 180 electrical degrees and preferably is of the order of 90 electrical degrees, as best shown in FIGS. 6 and 7. A washer 47 of cold rolled steel or other magnetic material serves to maintain the sections in spaced relationship with each other.

The rotor 40 has three possible quiescent stopping positions which are respectively illustrated in FIGS. 6 and 7, FIGS. 8 and 9, and FIGS. 10 and 11. In each of these positions the rotor poles of at least one of the sections 44 and 45 are displaced from the center of the stator pole 41 so that, when the field coil is again energized, the rotor is self-starting. poles on direction The most natural stopping position for the rotor 40 is that shown in FIGS. 6 and 7. In this position each of the poles of the two rotor sections 44 and 45 is displaced from the center of the stator pole 41, and the rotor pole of the section 44 closest to the stator pole is of a polarity to that of the closest rotor pole of the section 45. This is the stopping position of minimum reluctance. The magnetic rotor flux follows a path from the north pole of the section 45 to the stator pole 41, then spirally in both an axial and circumferential direction along the stator pole to a position adjacent the rotor section 44, and then from the stator pole to the south pole of this latter section.

Upon the energization of the field coil, the first half cycle of flux from the stator pole 41 is of either north or south polarity. With the rotor sections 44 and 45 in their FIGS. 6 and 7 positions, if the stator pole flux is north the sections will rotate in a clockwise direction and will reach synchronous speed within the first half cycle in the manner described heretofore with respect to the embodiment of FIGS. 1–4. Conversely, if the stator pole is initially of south polarity, the rotor sections will rotate in a counterclockwise direction, again reaching synchronous speed within the first half cycle.

Figure 8:
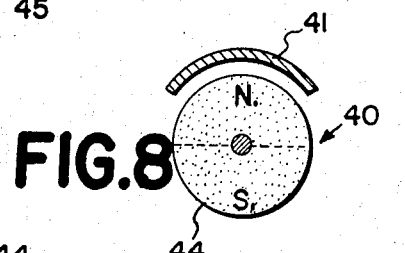
FIGS. 8 and 9 are schematic sectional views respectively similar to FIGS. 6 and 7 but showing another of the quiescent stopping positions for the motor of FIG. 5.
Figure 9:
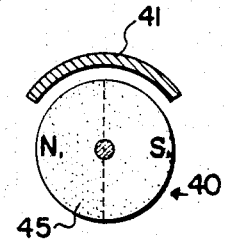

In some cases, as a result of friction from the rotor shaft, bearings, gear train, etc., the rotor 40 may stop in the position illustrated in FIGS. 8 and 9. In this latter position, the poles of one of the rotor sections 44 or 45 are in line with the center of the stator pole 41, while the poles of the other rotor section are oriented at ninety degrees with respect to the center of the stator pole. Here again, when the stator pole 41 is energized, a definite starting torque is produced to initiate rotation in one direction or the other. If the rotor sections stop with the north pole of the section 44 adjacent the stator pole, for example, when the stator pole becomes energized with north magnetic flux there will be no starting torque as a result of the section 44, but a positive torque will act onn the section 45 to drive both sections in a counterclockwise direction. More generally, as long as the poles of at least one of the sections are displaced from the center of the stator pole, a component of the rotor flux moves circumferentially through the stator pole, and the self-starting characteristic of the rotor is maintained.

Figure 10:
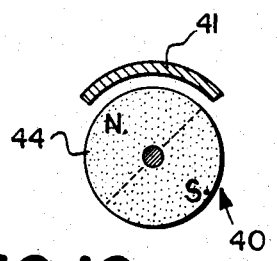
FIGS. 10 and 11 are schematic sectional views respectively similar to FIGS. 6 and 7 but showing still another of the quiescent stopping positions for the motor of FIG. 5.
Figure 11:
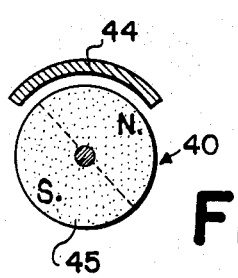

In certain rare instances, the rotor sections 44 and 45 may come to rest in the quiescent stopping position illustrated in FIGS. 10 and 11. In this latter position the rotor poles of each section are displaced from the center of the stator pole 41 and are in a magnetically balanced condition, that is, the north pole of each section is closer to the stator pole than the south pole, and the north pole are equally spaced on opposite sides of the center of the stator pole. Upon energization of the field coil, the build-up of magnetic flux begins at the base of the stator pole adjacent the rotor section 44. The flux first influences the section 44 and will attract or repel (depending on the polarity) the adjacent rotor pole of that section prior to the time the flux influences the rotor section 45. The section 44 is thus moved in one diretion or the other to similarly move the section 45 and unbalance the interacting magnetic forces to produce the desired rotation.

The washer 47 between the rotor sections 44 and 45 is believed to improve the flux relationship between the sections and to provide even further reliability with respect to the self-starting characteristics of the motor. In some embodiments of the invention, however, the washer may be eliminated and the rotor sections placed in abutting relationship with each other without materially detracting from the motor's operating parameters.

Each of the motors in accordance with the illustrated embodiments of the invention is of round configuration and includes an elongated rotor having one or more pairs of nonsalient rotor poles of alternate polarity. The motors also include only a single unshaded salient stator pole in magnetic flux relationship with the rotor. The motors exhibit high torque and cool running characteristics and are readily sealable in compact units.

Whereas the invention has been described and illustrated with respect to electric motors, the illustrated and other embodiments may be operated as alternating current generators. By mechanically driving the rotor shaft, an alternating voltage is produced at the coil leads 25 and 26.

The invention also may be operated as a two-wire or three-wire stepper motor. To provide a two-wire stepper motor, a permanent biasing magnet of the type disclosed in A.W. Haydon U.S. Pat. No. 3,495,107, for example, is placed in juxtaposition with the pole piece 17 to bias the stator pole 18 with flux of either north or south polarity. Upon the application of unipolar d.c. pulses of the opposite polarity to the field coil 16, the biasing flux is overcome, and the rotor 19 moves in successive discrete increments or steps. For a three-wire stepper motor, the coil 16 is replaced by a split coil having three input leads.

In cases in which it is desired to provide the motor with uni-directional starting characteristics, the permanent biasing magnet may be employed in combination with a tapered or nonuniform air gap between the stator pole 18 and the rotor 19. If, for example, the stator pole 18 is twisted slightly in a clockwise direction from the position shown in FIG. 4, the air gap will be smaller at the right-hand edge of the stator pole than at the left-hand edge. If the stator pole is provided with a south magnetic bias, the quiescent position of the rotor 19 will be one in which its north pole faces the right-hand edge of the stator pole. Upon the application of a d.c. current pulse to the field coil of a strength and polarity sufficient to produce north magnetic flux on the stator pole, the rotor starts in a clockwise direction and rotates 180 mechanical degrees. When the pulse terminates, the rotor continues its clockwise movement for another 180 mechanical degrees. The rotor thus rotates a full 360 mechanical degrees in response to each complete pulse.

It will be understood from the foregoing that there have been described self-starting electric rotating machines which employ an entirely novel principle of construction and operation and which enable great savings while attaining excellent reliability.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An electric rotating machine comprising, in combination:

a permanent magnet rotor having a plurality of rotor poles of alternate polarity;

only a single salient stator pole in magnetic flux relationship with the rotor; and means for energizing the single salient stator pole with magnetic flux, so that at a given moment said stator pole is of one polarity.

2. An electric rotating machine comprising, in combination:

a permanent magnet rotor having a plurality of rotor poles of altPrnate alternate only a single salient stator pole in magnetic flux relationship with the rotor; and means for energizing the single salient stator pole with magnetic flux, the rotor being adapted consistently to assume a position with respect to the stator pole, when the machine is in a de-energized condition, in which the rotor poles are displaced from the center of the stator pole so that, when the machine is again energized, the rotor is self-starting.

3. An electric rotating machine as defined in claim 2, in which the rotor comprises a plurality of axially spaced rotor sections which each have a plurality of rotor poles.

4. An electric rotating machine as defined in claim 3, which further comprises magnetic means for maintaining the rotor sections in axially spaced relationship.

5. An electric rotating machine comprising, in combination:

a permanent magnet rotor having only a single pair of nonsalient rotor poles of alternate polarity;

only a single salient stator pole in magnetic flux relationship with the rotor; and means for energizing the single salient stator pole with magnetic flux, so that at a given moment said stator pole is of one polarity, the rotor being adapted consistently to assume a position with respect to the stator pole, when the machine is in a de-energized condition, in which the rotor poles are displaced from the center of the stator pole so that, when the machine is again energized, the rotor is self-starting.

6. A self-starting electric motor comprising, in combination:

a permanent magnet rotor having a plurality of rotor poles of alternate polarity;

only a single salient stator pole in magnetic flux relationship with the rotor, the stator pole being positioned parallel to the axis of rotation of the rotor such that the path of minimum reluctance through the stator pole when the rotor is in its quiescent position is one in which flux passes from a given rotor pole, circumferentially through the stator pole, and back to another rotor pole; and a field coil for energizing the single salient stator pole with magnetic flux, the rotor being adapted consistently to assume a position with respect to the stator pole, when the field coil is de-energized, in which the rotor poles are displaced from the center of the stator pole so that, when the field coil is again energized, the rotor is self-starting.

7. A self-starting electric motor as defined in claim 6, in which the angle subtended by the stator pole with respect to the axis of rotation of the rotor is within the range of from about 90 electrical degrees to about 180 electrical degrees.

8. An electric rotating machine comprising, in combination:

a permanent magnet rotor having nonsalient rotor poles, the ratio of the length to the diameter of the rotor being at least about 1.25 to 1;

only a single salient stator pole in magnetic flux relationship with the rotor, the stator pole being positioned near the rotor poles such that the path of minimum reluctance through the stator pole when the rotor is in its quiescent position is one in which flux passes from a given rotor pole, circumferentially through the stator pole, and back to another rotor pole; and a field coil for energizing the single salient stator pole with alternating magnetic flux, the rotor being adapted consistently to assume a position with respect to the stator pole, when the field coil is de-energized, in which the rotor poles are displaced from the center of the stator pole so that, when the field coil is again energized, the rotor is self-starting.

9. An electric rotating machine comprising, in combination:

a permanent magnet rotor having a plurality of nonsalient rotor poles of alternate polarity;

a cylindrical stator structure coaxial with the rotor, the stator structure including a stator pole piece of magnetic material and only a single salient stator pole in magnetic flux relationship with the rotor; and means for energizing the single salient stator pole with alternating magnetic flux, so that at a given moment said stator pole is of one polarity, the rotor being adapted consistently to assume a position with respect to the stator pole, when the machine is in a de-energized condition, in which the rotor poles are displaced from the center of the stator pole so that, when the machine is again energized, the rotor is self-starting.

10. An electric rotating machine as defined in claim 9, in which the stator pole piece is of cup-shaped configuration, and the single salient stator pole is integrally formed with the pole piece.

11. An electric rotating machine as defined in claim 9, in which the ratio of the length to the diameter of the rotor is at least about 1.25 to 1.

12. An electric rotating machine as defined in claim 9, in which the rotor is of ceramic material that has high magnetic coercivity, low permeability and low specific gravity, the rotor having a greater axial length than diameter.

13. A self-starting electric motor comprising, in combination:

a permanent magnet rotor having two rotor pole pairs in axially spaced relationship with each other;

only a single salient pole in magnetic flux relationship with the rotor, the stator pole being positioned near each of the pairs of rotor poles such that the path of minimum reluctance through the stator pole when the rotor is in its quiescent position is one in which flux passes from a given rotor pole, circumferentially through the stator pole, and back to another rotor pole; and a field coil for energizing the single salient pole with alternating magnetic flux, the rotor being adapted consistently to assume a position with respect to the stator pole, when the field coil is de-energized, in which the rotor poles in at least one of said pairs are displaced from the center of the stator pole so that, when the field coil is again energized, the rotor is self-starting.

14. A self-starting electric motor comprising, in combination:

a permanent magnet rotor having nonsalient rotor pole pairs in axially spaced relationship with each other, the respective pairs having a fixed angular displacement with respect to one another which is less than 180 electrical degrees;

only a single salient stator pole in magnetic flux relationship with the rotor, the stator pole being positioned near each of the pairs of rotor poles such that the path of minimum reluctance through the stator pole when the rotor is in its quiescent position is one in which flux passes from a given rotor pole, circumferentially through the stator pole, and back to another rotor pole; and a field coil for energizing the single salient stator pole with alternating magnetic flux, the rotor being adapted consistently to assume a position with respect to the stator pole, when the field coil is de-energized, in which the rotor poles in at least one of said pairs are displaced from the center of the stator pole so that, when the field coil is again energized, the rotor is self-starting.

15. A self-starting electric motor comprising, in combination:

a permanent magnet rotor including two axially spaced rotor sections which each having only a single pair of nonsalient rotor poles, the rotor pole pairs in the respective sections having a fixed angular displacement with respect to one another;

only a single salient stator pole in magnetic flux relationship with the rotor; and a field coil for energizing the single salient stator pole with alternating magnetic flux, the rotor being adapted consistently to assume a position with respect to the stator pole, when the field coil is de-energized, in which the rotor poles in at least one of said pairs are displaced from the center of the stator pole so that, when the field coil is again energized, the rotor is self-starting.

16. A self-starting electric motor comprising, in combination:

a rotor including two permanent magnet rotor sections and an intermediate section of magnetic material for maintaining the permanent magnet sections in axially spaced relationship with each other, each of the permanent magnet section having a pair of nonsalient rotor poles arranged such that the rotor poles in the respective sections have a fixed angular displacement with respect to one another which is less than 180 electrical degrees;

only a single salient stator pole in magnetic flux relationship with the rotor, the stator pole being positioned near each of the pairs of rotor poles such that the path of minimum reluctance through the stator pole when the rotor is in its quiescent position is one in which flux passes from a given rotor pole, circumferentially through the stator pole, and back to another rotor pole; and a field coil for energizing the single salient stator pole with alternating magnetic flux, the rotor being adapted consistently to assume a position with respect to the stator pole, when the field coil is de-energized, in which the rotor poles in at least one of said pairs are displaced from the center of the stator pole so that, when the field coil is again energized, the rotor is self-starting.

* * * * *

UNITED STATES PATENT OFFICE
CERTIFICATE OF CORRECTION

Patent No. 3,770,998          Dated November 6, 1973

Inventor(s) Arthur W. Haydon

It is certified that error appears in the above-identified patent and that said Letters Patent are hereby corrected as shown below:

Column 1, last line "principle" should be plural.

Column 2, line 37, "the" should be deleted.

Column 2, line 56, "thee" should be changed to --the--.

Column 5, line 46, "one" should be inserted after "of".

Column 5, line 63, "poles on direction" should be deleted.

Column 6, line 2, --opposite-- should be inserted after "polarity".

Column 6, line 35, "onn" should be changed to --on--.

Column 8, line 7, "altPrnate alternate" should be changed to --alternate polarity;--.

Signed and sealed this 27th day of August 1974.

(SEAL)
Attest:

McCOY M. GIBSON, JR.          C. MARSHALL DANN
Attesting Officer             Commissioner of Patents